United States Patent
Kennedy et al.

(10) Patent No.: US 10,757,130 B2
(45) Date of Patent: *Aug. 25, 2020

(54) MESSAGE AUTHENTICITY AND RISK ASSESSMENT

(71) Applicant: Agari Data, Inc., San Mateo, CA (US)

(72) Inventors: Scot Free Kennedy, San Francisco, CA (US); Vidur Apparao, San Mateo, CA (US); Kevin Mandich, San Mateo, CA (US)

(73) Assignee: Agari Data, Inc., San Mateo, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/167,855

(22) Filed: Oct. 23, 2018

(65) Prior Publication Data

US 2019/0058727 A1    Feb. 21, 2019

Related U.S. Application Data

(63) Continuation of application No. 15/040,288, filed on Feb. 10, 2016, now Pat. No. 10,154,056.

(51) Int. Cl.
*H04L 29/06* (2006.01)
*H04L 12/58* (2006.01)
*H04L 29/12* (2006.01)

(52) U.S. Cl.
CPC .......... *H04L 63/1433* (2013.01); *H04L 51/04* (2013.01); *H04L 61/2007* (2013.01); *H04L 63/1466* (2013.01); *H04L 63/1483* (2013.01)

(58) Field of Classification Search
CPC ............. H04L 63/1433; H04L 63/1466; H04L 63/1483; H04L 51/04; H04L 61/2007
See application file for complete search history.

(56) References Cited

U.S. PATENT DOCUMENTS

| | | | |
|---|---|---|---|
| 7,953,814 B1 | 5/2011 | Chasin | |
| 2006/0123083 A1* | 6/2006 | Goutte | G06Q 10/107 709/206 |
| 2006/0168024 A1 | 7/2006 | Mehr | |
| 2007/0079379 A1* | 4/2007 | Sprosts | H04L 63/126 726/24 |
| 2008/0133672 A1 | 6/2008 | Gillum | |
| 2009/0307320 A1* | 12/2009 | Golan | G06Q 10/107 709/206 |
| 2010/0138539 A1 | 6/2010 | Neville | |
| 2013/0041955 A1 | 2/2013 | Chasin | |

(Continued)

FOREIGN PATENT DOCUMENTS

WO    2006119506    11/2006

OTHER PUBLICATIONS

EP Application No. 17150888.0, Communication of a notice of opposition, dated Aug. 14, 2019.

*Primary Examiner* — Cheng-Feng Huang
(74) *Attorney, Agent, or Firm* — Van Pelt, Yi & James LLP

(57) ABSTRACT

Assessing a risk of a message is disclosed. A sender specified by the message is identified. A measure of authenticity that the sender specified by the message is an actual sender of the message is determined using at least one sender model associated with the sender. The sender model was at least in part automatically generated using one or more previously observed messages. The measure of authenticity is utilized to perform a risk assessment of the message.

20 Claims, 5 Drawing Sheets

(56) References Cited

U.S. PATENT DOCUMENTS

| | | |
|---|---|---|
| 2013/0191480 A1* | 7/2013 | Oliver .................... H04L 51/12 |
| | | 709/206 |
| 2014/0331283 A1 | 11/2014 | Stein |
| 2014/0373141 A1 | 12/2014 | Yanovsky |
| 2016/0044054 A1 | 2/2016 | Stiansen |

* cited by examiner

MESSAGE AUTHENTICITY AND RISK ASSESSMENT

CROSS REFERENCE TO OTHER APPLICATIONS

This application is a continuation of co-pending U.S. patent application Ser. No. 15/040,288, entitled MESSAGE AUTHENTICITY AND RISK ASSESSMENT filed Feb. 10, 2016, which is incorporated herein by reference for all purposes.

BACKGROUND OF THE INVENTION

Malicious messages such as malicious email can take many forms. Common forms of malicious email include spoofed messages utilized in phishing, malware or social engineering attacks. Cybercriminals send an email message that appears to be a legitimate email message representing a legitimate identity from what appears to be a legitimate email server to an unsuspecting victim but this email message is actually a spoofed email message. While the email server that originates the spoofed email may not have a previous history of malicious behavior, it is not a legitimate source for the identity the spoofed email claims to represent.

The spoofed email may contain malicious attachments or may link to a malicious target destination controlled by the cybercriminal to phish information from the victim for criminal purposes. For example, a cybercriminal sends an email message that appears to be sent by a financial bank institution by spoofing the text of the "from" address to be a legitimate email address of the financial bank institution. However the message will contain a link that links to a webpage of the criminal requesting login credentials of the victim. Alternatively, the email message may spoof a trusted identity and contain instructions or simply establish a history of communications that can be exploited at a later date. For example, a cybercriminal sends an email message to the finance department of a company that appears to be sent by an executive of the company requesting a wire transfer to an account that is controlled by the criminal.

Although standardized email validation platforms may be utilized to verify that an identified sender of the message has actually sent the message, much email traffic today does not take advantage of these email validation platforms. Therefore, there exists a need for a more flexible way to identify authenticity and security risk of a message and reputation of a sender.

BRIEF DESCRIPTION OF THE DRAWINGS

Various embodiments of the invention are disclosed in the following detailed description and the accompanying drawings.

DETAILED DESCRIPTION

Figure 1:
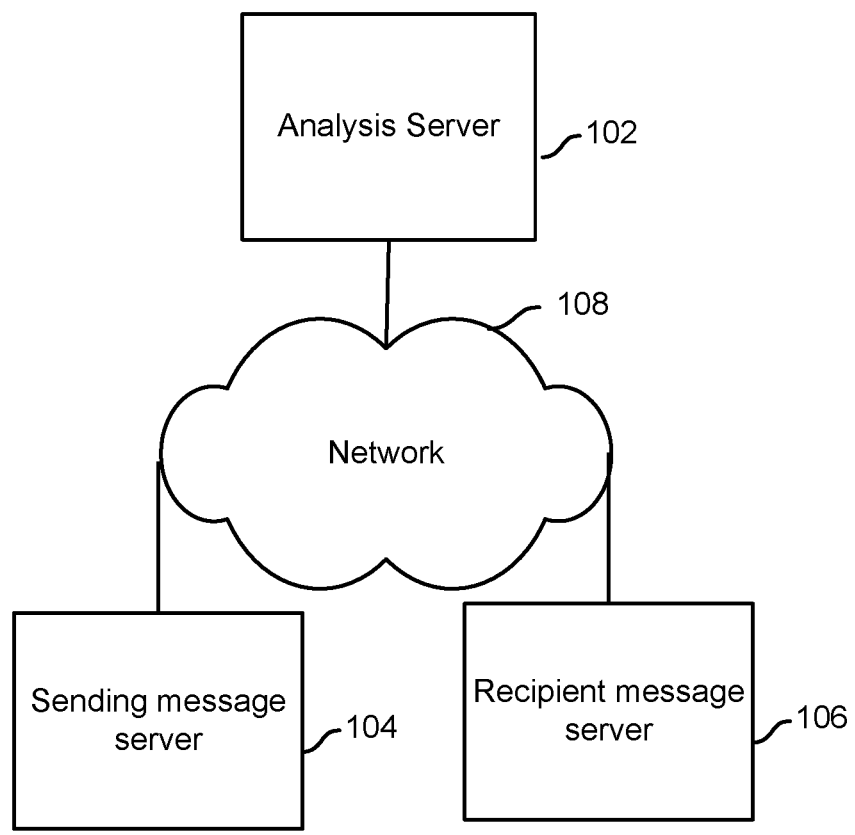
FIG. 1 is a diagram illustrating an embodiment of a system environment for analyzing a message.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Performing a risk assessment of a message is disclosed. In some embodiments, a message is received. For example, an email message is received at an email gateway server to deliver to a recipient. A sender specified by the message is identified. For example, an email address and/or a network/Internet domain specified in a header of the message is identified. A measure of authenticity that the sender specified by the message is an actual sender of the message is determined using a sender model associated with the sender. By determining the measure of authenticity (e.g., numerical value), a likelihood that the message is a spoofing message may be determined. In some embodiments, the sender model encodes properties that are characteristic of authentic messages that include an identifier of the sender (e.g., domain). For example, the sender model includes Internet protocol (i.e., IP) addresses that correspond to servers that are authorized or historically known to originate messages for that sender and it is determined whether the message was last sent from a server with an IP address that is included in the sender model. Even if the sender IP address of the message is not included in the sender model, the message may have been sent by an authorized server of the sender and a measure of likelihood that the message was actually sent by the sender is determined. The sender model was at least in part automatically generated using one or more previously observed/received messages. For example, by analyzing previously received messages from the sender that were determined to have been sent by the sender, one or more IP addresses of authorized servers associated with the sender is automatically detected and encoded in the sender model. Other characteristics of previously received messages that were determined to have been sent by the sender may also be included in the sender model. For example, a temporal pattern of delivery of legitimate messages sent by or on behalf of the sender may be detected and included in the sender model. The measure of authenticity is utilized to perform a risk assessment of the message. For example, the measure of authenticity may be combined with one or more other measures to determine a likelihood the message is an undesired and/or malicious message. Based on the risk assessment, the message may be flagged, quarantined, not delivered, or delivered to an intended recipient of the message.

FIG. 1 is a diagram illustrating an embodiment of a system environment for analyzing a message. Examples of the message include an electronic mail (i.e., email), an instant message, a chat message, and any other forms of electronic messages. Analysis server 102 is connected to recipient message server 106 via network 108. In some embodiments, analysis server 102 is directly embedded or implemented in recipient message server 106. Sending message server 104 sends a message to recipient message server 106 for delivery to a recipient associated with recipient message server 106. In some embodiments, recipient message 106 is a local message server. For example, recipient message server 106 is an email gateway server that at least processes incoming email messages for one or more recipient users of an organization (e.g., for users with a common domain email address). In various embodiments, recipient message server 106 may be any type of server that receives a message for delivery to a recipient user.

Sending message server 104 is the last server that handled a message prior to delivery to recipient message server 106 via network 108. For example, sending message server 104 is an outgoing email server of a sender of the message. In various embodiment, sending message server 104 may be any type of server able to send a message to recipient message server 106. Although the message received by recipient message server 106 may have traveled through a plurality of different servers before reaching recipient message server 106, because information about previous intermediary servers can be modified by a subsequent server, recipient message server 106 can only verify and rely on the identity of the last sending server before the message reaches recipient message server 106 as a proxy for an identity of an origin of the message. Recipient message server 106 processes a received message and filters for potentially harmful or undesired messages. For example, incoming messages are filtered and analyzed for spam, viruses, spoofing, and any other harmful or undesired content to prevent or minimize such messages from reaching a message recipient served by the recipient message server.

In some embodiments, recipient message server 106 performs virus, spam, and malware filtering using available antivirus, spam, and/or malware detection/filtering solutions. However, because these solutions are based on signature detection of common elements of known spam/malware messages, these solutions often cannot detect new types of malicious messages or infrequently encountered malicious messages that do not match existing signatures. One common form of malicious email is spoofing messages utilized in phishing attacks. Cybercriminals may send an email message that appears to be a legitimate email message representing a legitimate identity from what appears to be a legitimate email server to an unsuspecting victim but this email message is actually a spoofed email message. While the email server that originates the email may not have a previous history of malicious behavior, it is not a legitimate source for the identity the email claims to represent. For example, a cybercriminal sends an email message that appears to be sent by a financial bank institution by spoofing the text of the "from" address to be a legitimate email address of the financial bank institution and/or utilizing the same logo and email message formatting of a typical email communication from the financial bank institution, but a link contained in the email message links to a webpage of the criminal requesting login credentials of the victim. These cybercriminals are often abusing the trust that a message recipient has built with a particular aspect of a legitimate email message.

In some embodiments, recipient message server 106 performs additional malicious/undesired message risk analysis of an incoming message after an existing spam filtering and/or malware/virus filtering has occurred to detect potentially harmful or undesired messages that were not identified by these existing solutions. In some embodiments, a risk analysis is performed for an incoming message at least in part by performing an authenticity and/or reputation analysis to determine an overall measure of risk (e.g., risk score). Performing authenticity analysis may include determining a measure of confidence that a sender identified in the message (e.g., domain of sender) is the actual sender of the message. Performing reputation analysis may include determining a measure that an identified sender of the email (e.g., domain of sender) is likely to send a message that is of value to a recipient (e.g., likelihood of sending message that a recipient would want/desire to receive).

In some embodiments, determining authenticity of a message includes utilizing sender profiles that link an identifier of a sender to one or more IP addresses of servers determined to be associated with the sender. These sender profiles may be determined by analysis server 102 and/or the determined results are accessed by recipient message server 106 from analysis server 102 via network 108. For example, analysis server 102 is in communication with a plurality of different recipient message servers and analysis server 102 at least in part automatically determines associations between sender identifiers (e.g., network/Internet domain, email address, etc.) and IP addresses by analyzing messages that have been received at one or more recipient message servers. In some embodiments, a sender model of a sender may be specifically determined for a particular recipient (e.g., specific for all recipients of a particular domain, particular for an individual recipient, etc.). For example, a sender may only utilize a specific server with a first IP address for one group of recipients (e.g., recipients geographically located in North America) while another server with a second IP address is only utilized for another group of recipients (e.g., recipients geographically located in Asia).

In some embodiments, determining a reputation of a sender of a message includes utilizing a predetermined database of senders and their associated reputations. The reputations of senders may be determined by analysis server 102 and/or the determined reputations are accessed by recipient message server 106 from analysis server 102 via network 108. For example, analysis server 102 is in communication with a plurality of different recipient message servers and the analysis server 102 at least in part automatically determines a reputation score for a sender (e.g., network/Internet domain, email address, etc.) at least in part by using machine learning to analyze messages from the sender that have been received at one or more recipient message servers. In some embodiments, a reputation of a sender may be specifically determined for each particular message recipient (e.g., specific for all recipients of a particular domain, particular for an individual recipient, etc.). For example, a measure of reputation for a sender may be different for each different message recipient based on whether the recipient has had a prior communication relationship with the sender.

In some embodiments, the risk analysis performed by recipient message server 106 results in a risk value corresponding to the combination of the authenticity and reputation measures of the message. The risk value may be utilized at least in part to flag/label the message and/or determine whether to allow the message to be delivered to an intended recipient of the message.

Examples of network 108 include one or more of the following: a direct or indirect physical communication connection, a mobile communication network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly. Although single instances of many of the components shown in FIG. 1 have been shown to simplify the diagram, additional instances of any of the components shown in FIG. 1 may exist. For example, a plurality of recipient message servers are connected and/or managed by analysis server 102. Multiple analysis servers may exist. Multiple recipient message servers may serve the same recipient entity/domain. Components not shown in FIG. 1 may also exist. Any of the components shown in FIG. 1 may be a logical, physical, or virtual component.

Figure 2:
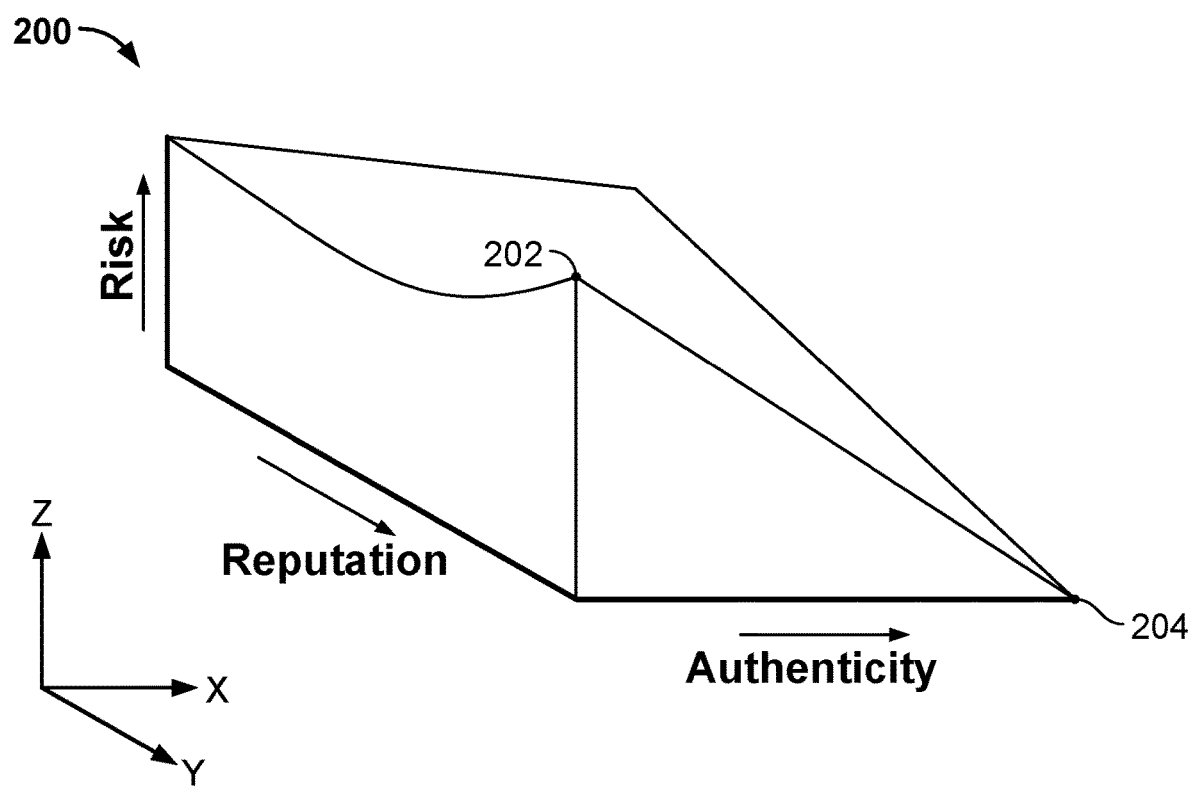
FIG. 2 is a graph illustrating an example graph of a relationship between an authenticity value, a reputation value, and a risk value.

FIG. 2 is a graph illustrating an example graph of a relationship between an authenticity value, a reputation value, and a risk value. Graph 200 illustrates a measure of risk as a function of both a measure of reputation value and a measure of authenticity. For example, when a message is received at recipient message server 106 of FIG. 1, it is analyzed to determine a reputation value associated with an identified sender of the message and an authenticity value of the message. Using both of these values, a corresponding risk value is looked up from a data structure/formula representative of the relationship shown in graph 200. Graph 200 includes three axis. In some embodiments, other properties of the message not otherwise used in determining authenticity and reputation values may also be incorporated into the data structure/formula to compute a final risk value.

The z-axis of graph 200 represents the risk measure/value and the risk value is greater in the direction shown by the arrow. A message with a lower risk value is more likely to be valued/desired by a recipient than a message with a higher risk value. A message with a risk value that is greater than a threshold value may be blocked from being delivered while a message with a risk value that is less than the threshold value may be allowed to be delivered to a recipient because it poses less risk that the message is undesired (e.g., less likely to be malicious, spam, etc.). The y-axis of graph 200 represents the reputation measure/value and the reputation value is greater in the direction shown by the arrow. The reputation value may correspond to a measure that an identified sender (e.g., domain) of a message is likely to send a message that is of value to a recipient (e.g., likelihood of sending message that a recipient would want/desire to receive). A sender with a low reputation value does not usually send a message that is of value to a recipient and a sender with high reputation value usually sends a message that is of value to a recipient. The x-axis of graph 200 represents the authenticity measure/value and the authenticity value is greater in the direction shown by the arrow. The authenticity value may correspond to a measure of confidence that a sender identified in the message (e.g., domain of sender) is the actual sender of the message. A message with a low authenticity value is likely a spoofing message while a message with a high authenticity value was likely sent by the sender identified in the message.

Graph 200 shows that the risk value generally increases with lower reputation and lower authenticity values. A notable exception shown in graph 200 is the highest risk value (represented by point 202) that corresponds to a high reputation value but a low authenticity value. For example, a recipient is more likely to trust a message from a sender with high reputation score but if the message was in fact sent by another sender that is not the sender indicated by the message, the message is likely a highly malicious message with potential to cause great harm by exploiting the trust a recipient has with a highly reputable entity being spoofed. Graph 200 shows that the lowest risk value (represented by point 204) corresponds to a message associated with a high reputation value and a high authenticity value. For example, a message from a highly reputable sender that has been determined to be actually sent by the sender is likely of value to a recipient with a low risk of malicious content. Graph 200 is merely one example relationship between risk, reputation, and authenticity values. In various embodiments, other relationships may exist.

Figure 3:
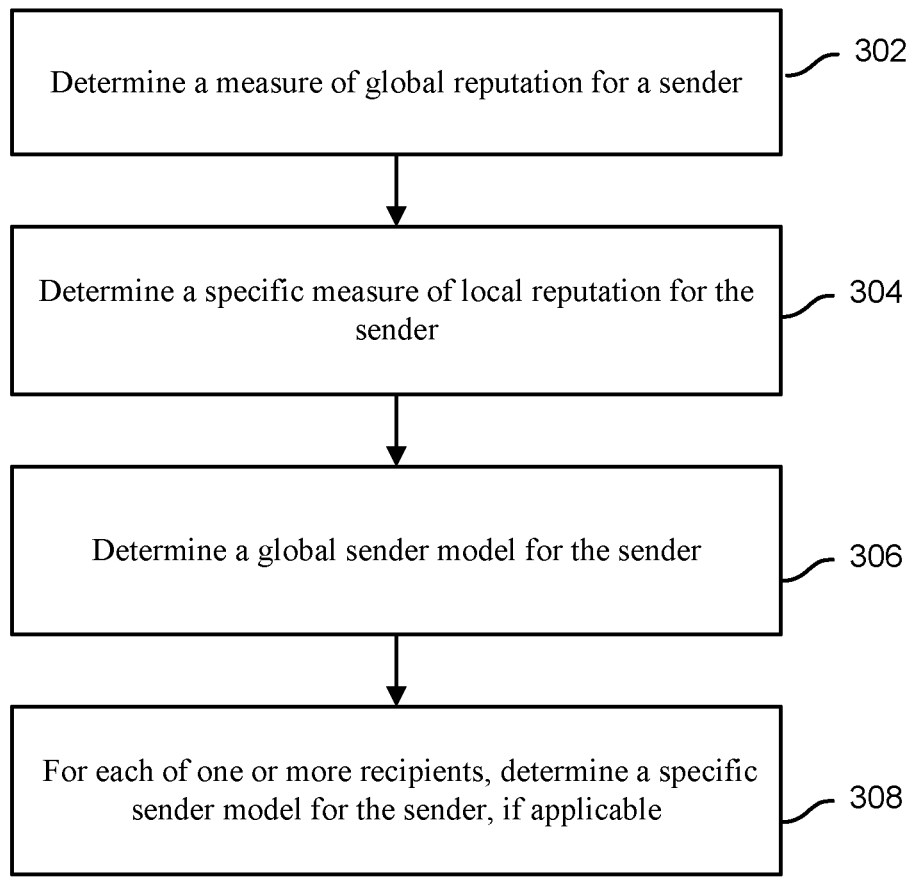
FIG. 3 is a flowchart illustrating an embodiment of a process for determining information about a sender to be utilized to assess a risk of a message.

FIG. 3 is a flowchart illustrating an embodiment of a process for determining information about a sender to be utilized to assess a risk of a message. The process of FIG. 3 may be at least in part implemented on analysis server 102. In some embodiments, the process of FIG. 3 may be at least in part implemented on recipient message server 106 to determine a measure of local reputation of a sender and/or a measure of a local sender model of a sender. The process of FIG. 3 may be repeated for each sender to be analyzed. The process of FIG. 3 may be at least in part performed for each sender in a list of senders that have sent messages stored in a repository of received messages. The repository may include messages received at one or more recipient message servers managed/accessed by an analysis server and/or from one or more other external sources of messages. In some embodiments, the list of senders to be processed may be received from a user/administrator. In some embodiments, the sender to be processed is dynamically selected. For example, in the event a sender of a message to be analyzed has not been previously processed, the sender is dynamically processed using at least a portion of the process of FIG. 3. The process of FIG. 3 may be repeated periodically.

At 302, a measure of global reputation for a sender is determined. The sender may correspond to a group of individual sender addresses in some embodiments or an individual sender address in other embodiments. In some embodiments, the sender is a network/Internet domain and the measure of global reputation corresponds to all individual sender addresses of the domain. For example, the determined measure of global reputation of a domain is applicable to all email addresses within the domain. In some embodiments, the measure of global reputation for a sender is specific to an individual sender address. For example, the measure of global reputation for a sender is specific to an email address. In some embodiments, the sender is one of a plurality of senders in a list of senders to be analyzed to predetermine its global reputation. The list of senders may be automatically determined from one or more previously received messages (e.g., senders of previously received messages) and/or specified by a user/administrator. The measure of global reputation of the sender is applicable for a plurality of recipients of a message from the sender while a measure of local reputation of the sender is specific to a particular recipient domain or individual recipient address of a message from the sender.

In some embodiments, the measure of global reputation indicates a general measure that a sender is likely to send a message that is of value to a recipient of the message. For example, a higher measure of reputation indicates a higher likelihood that any message sent by the sender will not include malicious and/or undesired content (e.g., message will not include a virus, malware, spam, etc.). In some embodiments, determining the measure of global reputation includes determining one or more component factors to be utilized to determine a total measure of global reputation. For example, each determined component factor may be utilized to add, subtract, or multiply a value to/from the measure of global reputation to determine the total measure of global reputation. In one example, determined component factor values are summed to determine the global reputation measure. In some embodiments, machine learning or another automated process is utilized to determine the measure of global reputation based on gathered/generated information about the sender of the global reputation.

In some embodiments, determining the measure of global reputation for the sender includes determining whether an identifier of the sender (e.g., domain name, sub domain, IP address) is included in a list of senders known to be reputable. For example, there exists a predetermined list of entities and their associated identifiers that are known to be reputable and if the identifier of the sender is included in the predetermined list, the resulting measure of global reputation would be higher than otherwise. In some embodiments, determining the measure of global reputation for the sender includes determining whether an identifier of the sender is included in a list of senders known to be not reputable. For example, there exists a list of IP addresses associated with a server that are known to be commonly utilized to send spam messages and in the event an IP address associated with the sender is included in this list, the determined measure of global reputation would be lower than otherwise. Whether the identifier of the sender is included in the list of senders known to be reputable or not reputable may be utilized to determine a component factor value utilized in determining the measure of global reputation of the sender.

In some embodiments, determining the measure of global reputation for the sender includes determining a category of business associated with an entity of the sender. For example, businesses in certain categories (e.g., banking) may be associated with a higher reputation than businesses in other categories (e.g., digital marketing). In some embodiments, using a list/database that maps an identifier of a sender to a known associated category/line of business, the category/line of business associated with the sender is determined, if applicable (e.g., the line of business for some senders may be unknown or not applicable). A reputation component factor (e.g., value to be added, multiplied, or subtracted to/from total score measure) associated with the identified category/line of business may be utilized in determining the measure of global reputation.

In some embodiments, determining the measure of global reputation for the sender includes analyzing domain registration history and Domain Name System (i.e., DNS) activity of the sender. For example, a sender that is typically reputable will register a domain name far ahead of time prior to the use of the domain while a less reputable sender will likely temporarily utilize a domain for a short period of time prior to moving on to another domain and will register a domain within a short amount of time prior to the use of the domain. In some embodiments, determining the measure of global reputation includes utilizing a component factor value determined based on the domain registration history and DNS activity analysis (e.g., add, multiply, subtract, etc. using the factor value). For example, the factor value is based at least in part on a length of time since registration of a domain of the sender, an amount of time between registration of the domain and a first use of the domain to send a message, Internet content (e.g., webpage) located at a URI utilizing the domain of the sender, an entity that registered the domain of the sender, etc.

In some embodiments, determining the measure of global reputation for the sender includes analyzing historical statistics and/or a history of messages sent by the sender. For example, there exists one or more repositories of previous messages sent by the sender and the repositories of messages are analyzed to determine one or more of the following: an amount/volume/rate of messages sent by the sender, a number/breadth of different recipients (e.g., number of different domains of recipients, number of different email addresses of recipients, etc.) of messages from the sender, a distribution of messages sent to different recipients, a length of time the sender has been sending messages, a regularity that the sender has been sending messages (e.g., difference in average number of messages per time period), a type of content of messages sent by the sender, a difference/regularity between content of messages sent by the sender, amount/rate of content opened/viewed by recipients of messages sent by the sender, a number/rate of messages sent by the sender that have been identified as malware, spam and/or a virus by an analysis/filter/scanner tool, etc. The historical analysis may be performed using machine learning. In some embodiments, based on the historical analysis, a historical analysis component factor value is determined and the historical analysis component factor value is added, multiplied, subtracted, etc. to determine the measure of global reputation for the sender.

In some embodiments, determining the measure of global reputation for the sender includes determining whether an identifier of the sender is similar to an identifier of another sender. For example, it is determined whether a domain of the sender is similar to a domain of another sender. Determining whether an identifier of the sender is similar to an identifier of another sender may include determining whether an identifier of the sender is similar to an identifier of another sender with a relatively high measure of global reputation. For example, an attempt to confuse a recipient by utilizing a domain that is only slightly different from a highly reputable domain is detected. In some embodiments, based on the similarity analysis, a similarity component factor value is determined and the similarity factor value is added, multiplied, subtracted, etc. to determine the measure of global reputation for the sender.

At 304, a specific measure of local reputation for the sender is determined for each of one or more different recipients. For example, although the measure of global reputation determined in 302 may apply to any recipient that receives a message from the sender, the specific measure of local reputation is only applicable to a specific recipient. In one example, one recipient may have a different relationship to a sender than another recipient (e.g., existing business relationship) and interest/relevance of a message from the sender may be different for different recipients and this difference is reflected as a different measure of local reputation for each different recipient. In some embodiments, the recipient represents a network/Internet domain and the measure of local reputation corresponds to all individual recipients of the domain. For example, the determined measure of local reputation for a recipient domain is applicable to all recipient email addresses within the domain. In some embodiments, the measure of local reputation for the sender is specific to an individual recipient address.

In some embodiments, the recipient is one of a plurality of recipients in a list of recipients to be analyzed to predetermine the local reputation of the sender for the specific recipient. The list of recipients may correspond to the recipients/email servers accessible (e.g., list of email domains being managed) by an analysis server. In some embodiments, each email server of each recipient performs its own determination of its measure of local reputation for the sender. In some embodiments, the measure of local reputation is determined dynamically. For example, when a recipient receives a message from the sender, the recipient determines the measure of local reputation for the sender.

In some embodiments, the measure of local reputation indicates a measure that the sender is likely to send a message that is of value to a specific recipient. For example, a higher measure of reputation indicates a higher likelihood that an authentic message sent by the sender will not include malicious and/or undesired content (e.g., message will not include a virus, malware, spam, etc.) for the specific recipient. In some embodiments, determining the measure of local reputation includes determining one or more factors to be utilized to determine a total measure of local reputation. For example, each determined factor may be utilized to add, subtract, or multiply a value to/from the measure of local reputation to determine the total measure of local reputation. In some embodiments, machine learning or another automated process is utilized to determine the measure of local reputation based on gathered/generated information about the sender.

In some embodiments, determining the measure of local reputation for the sender includes determining whether an identifier of the sender (e.g., domain name, sub domain, IP address) is included in a list of senders known to be reputable for the recipient. For example, there exists a predetermined list of entities and their associated identifiers that are known to be reputable for the specific recipient. If the identifier of the sender is included in the predetermined list, the resulting measure of local reputation would be higher than otherwise. In some embodiments, determining the measure of local reputation for the sender includes determining whether an identifier of the sender is included in a list of senders known to be not reputable for the specific recipient. For example, there exists a list of IP addresses associated with a server that are known to be commonly utilized to send spam messages and in the event an IP address associated with the sender is included in this list, the determined measure of local reputation would be lower than otherwise. Whether the identifier of the sender is included in the list of senders known to be reputable or not reputable may be utilized to determine a component factor value utilized to determine the measure of local reputation of the sender.

In some embodiments, determining the measure of local reputation for the sender includes determining a category of business associated with an entity of the sender with respect to a property of the specific recipient. For example, businesses in certain categories (e.g., banking) may be associated with a higher reputation than businesses in other categories (e.g., digital marketing) with respect to the category of business of the recipient (e.g., recipient is also in banking). In some embodiments, a reputation component factor (e.g., value to be added, multiplied, or subtracted to/from total score measure) associated with the identified category/line of business with respect to the recipient may be utilized in determining the measure of local reputation In some embodiments, determining the measure of local reputation for the sender includes analyzing domain registration history and Domain Name Service (i.e., DNS) activity of the sender with respect to a property of the recipient. For example, it may be typical for certain recipients to be in communication with senders that utilize a domain for a short period of time while for other recipients it is not typical. In some embodiments, determining the measure of local reputation includes utilizing a component factor value determined based on the domain registration history and DNS activity analysis (e.g., add, multiply, subtract, etc. using the factor value). For example, the factor value is based at least in part on a length of time since registration of a domain of the sender, an amount of time between registration of the domain and a first use of the domain to send a message, Internet content (e.g., webpage) located at a URI utilizing the domain of the sender, an entity that registered the domain of the sender, etc.

In some embodiments, determining the measure of local reputation for the sender includes analyzing historical statistics and/or a history of messages sent by the sender for the specific recipient domain or individual recipient addresses. For example, there exists a repository of previous messages sent by the sender to the recipient (e.g., messages stored at a recipient message server of the recipient) and the repository of messages is analyzed to determine one or more of the following: an amount/volume/rate of messages sent by the sender, a number/breadth of different individual users of the recipient (e.g., number of different email addresses of recipient) that received messages from the sender, a distribution of messages sent to different individual users of the recipient, a length of time the sender has been sending messages to the recipient, a regularity that the sender has been sending messages to the recipient (e.g., difference in average number of messages per time period), a type of content of messages sent by the sender to the recipient, a difference/regularity between content of messages sent by the sender to the recipient, amount/rate of content opened/viewed by the recipient of messages sent by the sender, a number/rate of messages sent by the sender that have been identified as malware, spam, and/or a virus by an analysis/filter/scanner tool, etc. The historical analysis may be performed using machine learning. In some embodiments, based on the historical analysis, a historical analysis component factor value is determined and the historical analysis component factor value is added, multiplied, subtracted, etc. to determine the measure of local reputation of the sender for the recipient.

In some embodiments, determining the measure of local reputation for the sender includes determining whether an identifier of the sender is similar to an identifier of another sender and/or an identifier of the recipient. For example, it is determined whether a domain of the sender is similar to a domain of another sender or a domain of the recipient. Determining whether an identifier of the sender is similar to an identifier of another sender or the recipient may include determining whether an identifier of the sender is similar to an identifier of another sender with a relatively high measure of local reputation for the recipient. For example, an attempt to confuse a user by utilizing a sender domain that is only slightly different from a highly reputable domain for the recipient is detected. In some embodiments, an attempt to confuse a user by utilizing a sender domain that is only slightly different from a domain of the recipient is detected (e.g., detect trying to mimic an intra organization message). In some embodiments, based on the similarity analysis, a similarity component factor value is determined and the similarity factor value is added, multiplied, subtracted, etc. to determine the measure of local reputation of the sender for the recipient.

At 306, a global sender model for the sender is determined. For example, the sender model may be utilized to determine whether a message that indicates that the message was sent by the sender was actually sent by the indicated sender. In some embodiments, the sender model identifies one or more properties that are characteristic of a message that is sent by the sender. In some embodiments, the sender model associates the sender with one or more IP addresses of message servers that are known or authorized to send messages for the sender. For example, an IP address of a last server that sent a message is a reliable identifier that indicates an origin of the message and this IP address information is utilized to determine whether the last server that sent the message corresponds to the sender identified in the message. In some embodiments, the sender model includes directly provided information. For example, a list of IP addresses of servers that send messages for the sender is received from a user, the sender, or a published source of information about the sender. In some embodiments, at least a portion of the sender model is determined using message authentication/validation information about the sender. For example, IP addresses associated with a domain of the sender are obtained using standardized message authentication/validation systems (e.g., using Domain-based Message Authentication (DMARC), DomainKeys Identified Mail (DKIM), Sender Policy Framework (SPF), etc.).

In some embodiments, the sender model is automatically determined. For example, using one or more repositories storing messages received from the sender, a list of server IP addresses authorized or historically known to send messages for the sender is automatically determined. The one or more repositories may include a message store of a plurality of different recipients (e.g., different recipient message servers managed by an analysis server) and external message sources (e.g., information from third-party sources that gather message information). Machine learning may be utilized to automatically detect sources of and properties that are characteristic of authentic messages from the sender using historical information about messages previously sent by or on behalf of the sender. In some embodiments, an IP address is automatically associated with the sender in the sender model if it is detected that a message likely/verified to be sent by the sender was sent from the IP address. In some embodiments, before an IP address is associated with the sender, the sender must have sent a message from the IP address at least a threshold number of times. In some embodiments, a message is determined to have been sent by the sender if the message was validated using an email authentication/validation system and/or sent from the IP address that has been utilized to send messages identified as being sent by the sender for at least a threshold amount of time and/or a threshold number of times. Other factors may be utilized to verify whether a message in a repository was sent by the sender prior to using IP address information of the message in determining the sender model of the sender.

In some embodiments, an IP address is only added to the sender model to be associated with the sender in the event the IP address has been determined to be consistent for the sender. For example, a history of senders associated with the IP address is analyzed and the IP address is only associated with the sender if the IP address is not already associated with another sender, has not been associated with another sender for at least a threshold amount of time, and/or the number of different previous different senders that have been with associated with the IP address is less than a threshold number.

In some embodiments, the sender model identifies one or more blocks of adjacent IP addresses that are authorized or historically known to send messages on behalf of the sender. These blocks of adjacent IP addresses may be owned or be under the control of a single administrative entity or domain or may be detected to exhibit similar sending behavior. The block of adjacent IP addresses may be specified by a user, a sender, an administrator, and/or a source of published information about the sender or a provider authorized by the sender. In some embodiments, one or more blocks of adjacent IP addresses to be included in the sender model is automatically determined. For example, once one or more IP addresses within a block of adjacent IP addresses have been associated with a sender model, the entire block of adjacent IP addresses may be associated with the sender model if they are determined or expected to exhibit similar message sending behavior.

In some embodiments, the sender model identifies a network/Internet domain that is common to all hostnames of servers that are authorized or historically known to send messages on behalf of the sender. The servers that share this network/Internet domain may be owned or be under the control of a single administrative entity or domain or may be detected to exhibit similar sending behavior. The network/Internet domain may be specified by a user, a sender, an administrator, and/or a source of published information about the sender or a provider authorized by the sender. In some embodiments, the network/Internet domain to include within the sender model is automatically determined. For example, once one or more IP addresses whose hostnames share an organizational network/Internet domain have been associated with a sender model, all servers whose hostname share that network/Internet domain may be associated with the sender model if they are determined or expected to exhibit similar message sending behavior.

In some embodiments, the sender model identifies one or more autonomous system numbers (i.e., ASN) associated with servers that are authorized or historically known to send messages on behalf of the sender. For example, an ASN identifies a collection of IP routing prefixes owned by or under the control of a single administrative entity or domain and the ASN associated with the sender is specified in the sender model. The ASN associated with the sender may be specified by a user, a sender, an administrator, and/or a source of published information about the sender. In some embodiments, the ASN associated with the sender is automatically determined. For example, once one or more IP addresses associated with a sender model have been identified, the ASN(s) associated with the IP addresses may be associated with the sender if they are determined or expected to exhibit similar message sending behavior.

The determined or specified sender model associated with a sender may be stored in a data structure such as a list, a database, a table, or any other data structure that can be indexed based on an identifier of the sender.

At 308, a specific sender model for the sender is determined for each of one or more recipients, if applicable. For example, although the sender model determined in 306 may apply to any recipient, the specific sender model is only applicable to a specific recipient. In one example, one recipient may receive a message from the sender via a different set of sending message servers than another recipient due to geographical location differences between the recipients. In some embodiments, the recipient represents a network/Internet domain and the recipient specific sender model corresponds to all individual recipients of the domain. In some embodiments, the recipient specific sender model is specific to an individual recipient address. In some embodiments, the recipient specific sender model is determined in a similar manner as the sender model determined in 306 except for utilizing data specific to the recipient rather than various different recipients. For example, using a repository storing messages received from the sender to only the recipient, individual or neighborhoods of IP addresses associated with the sender model for a sender are automatically determined.

Figure 4:
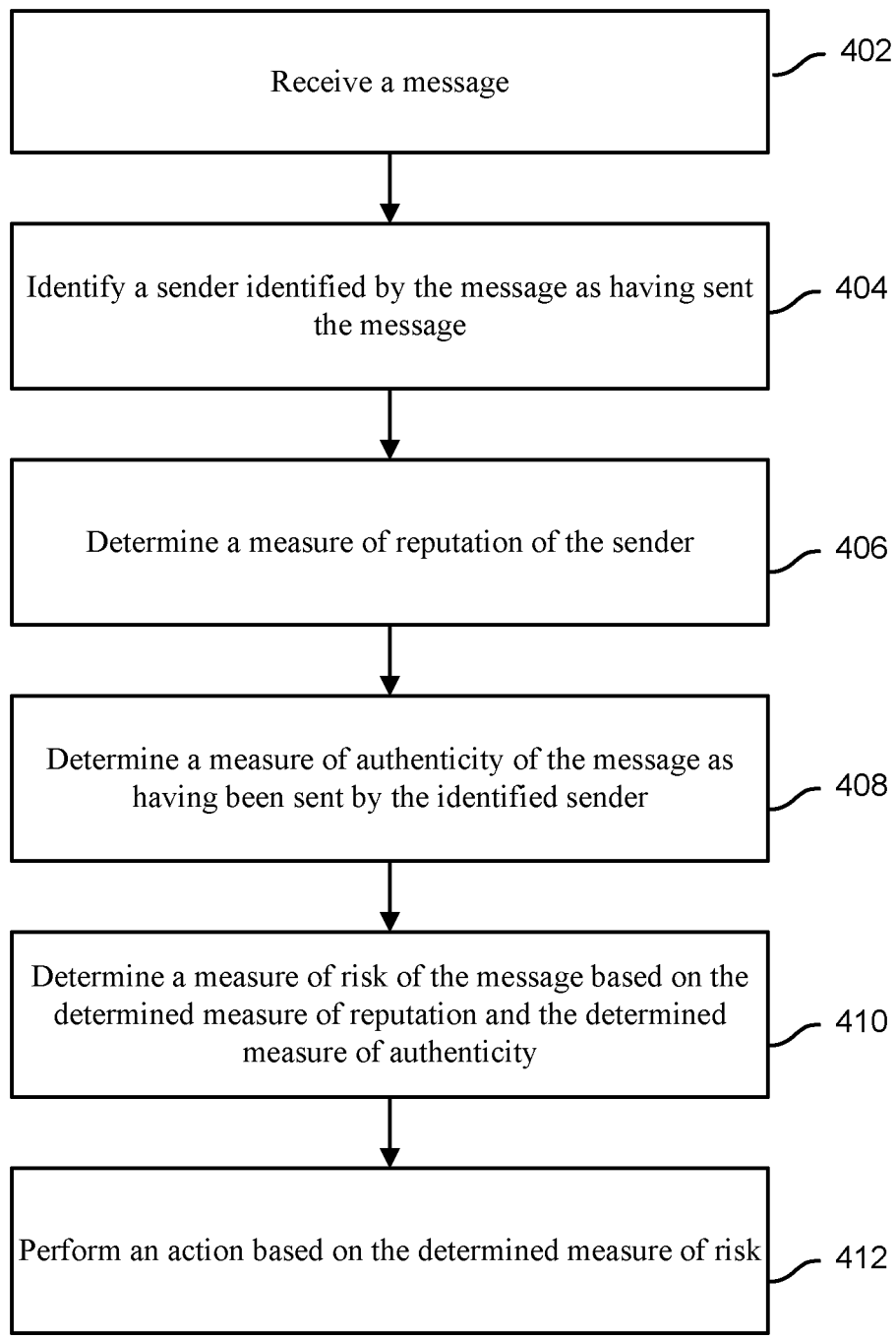
FIG. 4 is a flowchart illustrating an embodiment of a process for assessing a risk of a received message.

FIG. 4 is a flowchart illustrating an embodiment of a process for assessing a risk of a received message. The process of FIG. 4 may be implemented on recipient message server 106 of FIG. 1. In some embodiments, the process of FIG. 4 is at least in part implemented on analysis server 102 of FIG. 1 to process information provided by recipient message server 106. In some embodiments, the process of FIG. 4 may be repeated for each received message to be analyzed.

At 402, a message is received. In some embodiments, the received message is an email message received at an email gateway server for delivery to a recipient email address. In some embodiments, the message was provided by sending message server 104 to recipient message server 106 via network 108 of FIG. 1. In some embodiments, the message has been filtered/analyzed for malware, spam, and/or a virus using an antivirus scanner, spam filter, and/or malware scanner.

At 404, a sender identified by the message as having sent the message is identified. For example, a header of the message identifies an address of a sender of the message and this address is utilized to identify the sender. In some embodiments, the identified sender is a network/Internet domain of a sender email address. In some embodiments, the identified sender is an email address.

At 406, a measure of reputation of the sender is determined. For example, the measure of reputation of the sender is a value that approximates a likelihood that the identified sender of the email is likely to send a message that is of value to a recipient. In some embodiments, determining the measure of reputation includes identifying the measure of reputation that corresponds to the sender from a list/database of reputation values associated with senders. In some embodiments, step 406 is optional. For example, the measure of reputation may not need to be determined if it is determined that the measure of reputation is not required to assess the risk of the received message.

In some embodiments, the determined measure of reputation is the measure of global reputation determined in 302 of FIG. 3 and/or the measure of local reputation determined in 304 of FIG. 3. For example, in the event a measure of local reputation is not available and/or has not been determined for an identified recipient of the received message, the measure of global reputation predetermined in 302 of FIG. 3 for the sender is identified as the determined measure of reputation of the sender. In another example, in the event a measure of local reputation is available for an identified recipient of the received message (e.g., for a domain of a recipient email address), the measure of local reputation predetermined in 304 of FIG. 3 for the sender is identified as the determined measure of reputation of the sender. Determining the measure of reputation of the sender may include dynamically determining the measure of reputation using at least a portion of the process described in 302 and/or 304 of FIG. 3. In some embodiments, an identifier of the sender is provided to a server (e.g., analysis server 102 of FIG. 1) and the server provides a corresponding measure of reputation for the sender.

In some embodiments, determining the measure of reputation of the sender includes determining a combination of a measure of global reputation and a measure of local reputation for the sender. For example, a weighted average of the measure of global reputation and the measure of local reputation for the sender is utilized as the determined measure of reputation of the sender. The weighting values may be based on a measure of completeness of the local reputation (e.g., amount of time and/or data analyzed to determine the measure of local reputation for the recipient).

At 408, a measure of authenticity of the message as having been sent by the identified sender is determined. For example, because the address of the sender identified in the message may have been spoofed, a likelihood measure (e.g., score value) that the sender identified by the message actually sent the message is determined. In various embodiments, the determination of the measure of reputation and the determination of the measure of authenticity may occur in any order. In some embodiments, step 408 is optional. For example, the measure of authenticity may not need to be determined if it is determined that the measure of authenticity is not required to assess the risk of the received message. In some embodiments, determining the measure of authenticity includes obtaining a sender model of the sender of the message, if applicable. For example, the sender model predetermined in 306 and/or 308 of FIG. 3 and corresponding to the sender is obtained. Using the sender model, it is determined whether an IP address of a server that sent the message has a likelihood of sending messages for the sender and whether the messages exhibits characteristics associated with authentic messages sent by or on behalf of the sender. Even if the IP address of the server that sent the message is not specified by the sender model and/or the sender model is unavailable, various other factors may be utilized to determine the measure of authenticity of the message. In some embodiments, an IP address of the message and an identifier of the sender is provided to a remote server (e.g., analysis server 102 of FIG. 1) and the remote server returns the measure of authenticity.

At 410, a measure of risk of the message is determined based on the determined measure of reputation and the determined measure of authenticity. For example, the measure of risk identifies a likelihood that the message includes malicious/undesired content. In some embodiments, the measure of message risk is dependent on both a measure of reputation value and a measure of authenticity value. An example of this dependent relationship in shown in graph 200 of FIG. 2. In some embodiments, using both the measure of reputation and the measure of authenticity as index values, the measure of message risk is obtained from a list, a table, a database, a formula, a graph, and/or other data structure. For example using the determined measure of reputation and the determined measure of authenticity values, a look up is performed to obtain the corresponding value of the measure of message risk. The database/list of different values for the measure of message risk as a function of different reputation and authenticity values may be locally stored on a recipient message server and/or stored remotely on a central analysis server. The database/list of different values of the measure of message risk as a function of the different reputation and authenticity values may be dynamically changed/updated on a desired risk handling profile. In some embodiments, message attributes that may not otherwise utilized in the determination of the measure of authenticity and the measure of reputation may be utilized in determining the measure of risk. For example, message attributes such as whether the message includes an attachment or an external content link are utilized in determining the measure of risk.

At 412, an action is performed based on the determined measure of risk. In some embodiments, in the event a determined risk value is greater than one or more threshold values, the message may be blocked, not delivered to an intended recipient, flagged, labeled, deleted, quarantined, and/or reported. In some embodiments, in the event a determined risk value is less than one or more threshold values, the message may be allowed to be delivered, flagged, labeled, and/or reported.

Figure 5:
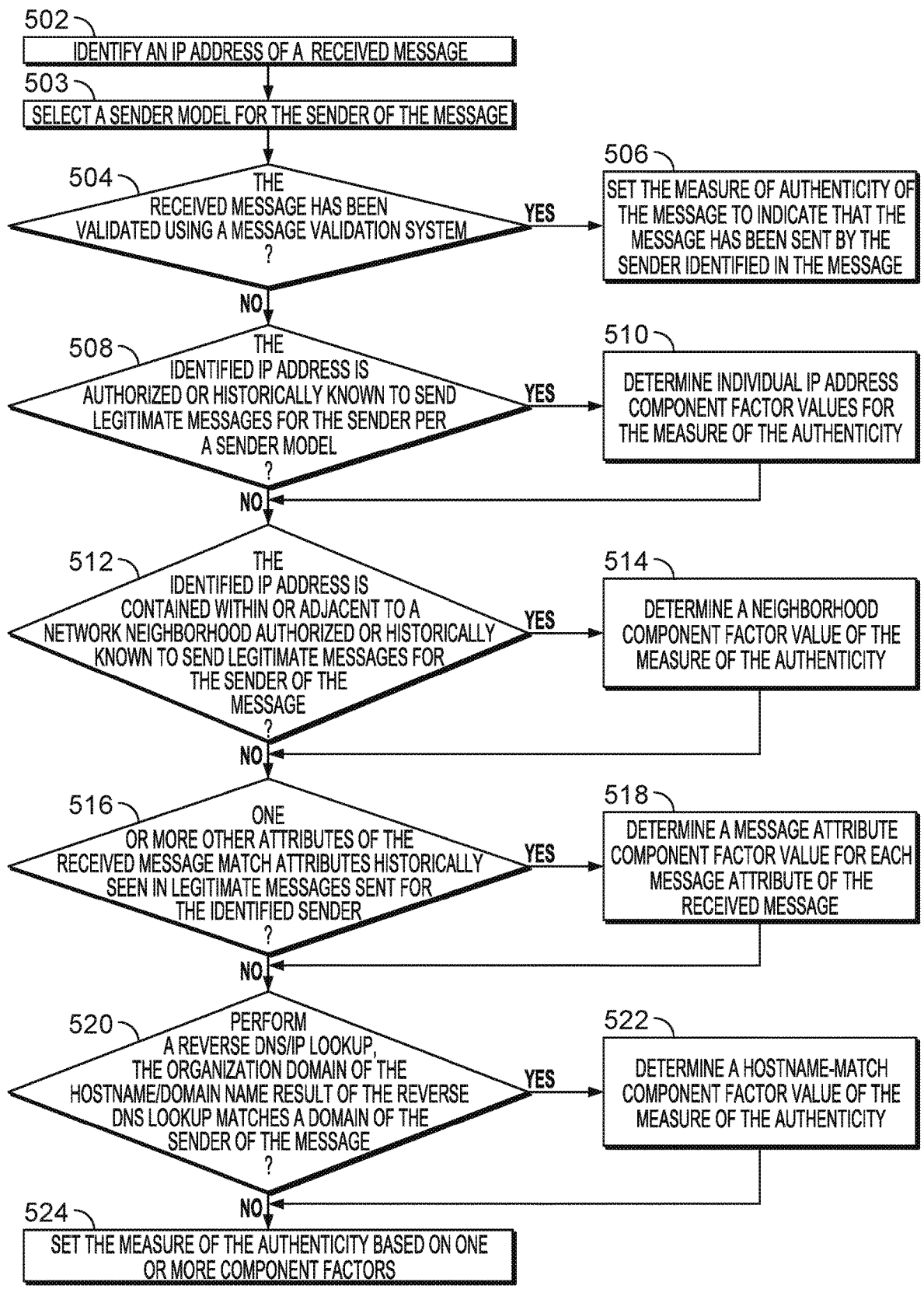
FIG. 5 is a flowchart illustrating an embodiment of a process for determining a measure of authenticity for a received message.

FIG. 5 is a flowchart illustrating an embodiment of a process for determining a measure of authenticity for a received message. The process of FIG. 5 may be implemented on recipient message server 106 of FIG. 1. In some embodiments, the process of FIG. 5 is at least in part implemented on analysis server 102 of FIG. 1 to process information provided by recipient message server 106. In some embodiments, the process of FIG. 5 is included in 408 of FIG. 4. For example, the process of FIG. 5 is utilized to determine the measure of authenticity determined in 408.

At 502, an IP address of a received message is identified. For example, the IP address of the last server that sent the received message is identified. In some embodiments, the received message is the message received in 402 of FIG. 4.

At 503, one or more sender models associated with the identified sender of the message is looked up, selected or retrieved from storage. In some embodiments, the sender is the sender identified in 404 of FIG. 4. The lookup or selection of the sender models may be implemented on analysis server 102 of FIG. 1. In some embodiments, the lookup or selection of the sender model may be implemented on recipient message server 106 of FIG. 1. The selected sender model associated with the sender may be specific to the recipient organization of the message, may be global to all recipients of messages from the sender or may be a default model applicable to all senders.

At 504, it is determined whether the received message has been validated using a message authentication/validation system. For example, it is determined whether the message has been validated using a standardized email message authentication/validation system such as DKIM, DMARC, SPF, etc. If at 504 it is determined that the received message has been validated using the message authentication/validation system, at 506, the measure of authenticity of the message is set to indicate that the message has been sent by the sender identified in the message. For example, the measure of authenticity of the message is set as the highest value. In some embodiments, the sender models of the sender of the message is updated using information of the validated message. For example, the historical sending behavior of the IP address of the message is recorded in the sender models for the sender of the message.

If at 504 it is determined whether the received message has not been validated, at 508, it is determined based on the selected sender models whether the identified IP address is authorized or historically known to send legitimate messages for the identified sender of the received message. For example, it is determined whether the selected sender models identifies an authorization or a previous history for the IP address of a server that sent the message.

If at 508 it is determined that the identified IP address of the message is authorized or historically known to send legitimate messages for the sender based on the selected sender models, at 510, an individual IP component factor value for the measure of the authenticity is determined based on the determination in 508. This component factor value may be added, subtracted, multiplied, and/or otherwise utilized in determining an overall measure of authenticity of the message.

At 512 it is determined whether the identified IP address is contained within or adjacent to a network neighborhood authorized or historically known to send legitimate email for the sender of the message. For example, a sender is typically in control of a block of adjacent IP addresses and an IP address that is contained within or adjacent to a block of adjacent IP addresses of the sender or adjacent to a single known IP address of the sender is more likely to be an IP address authorized to send messages for the sender than otherwise. In some embodiments, the network neighborhoods (e.g., block of adjacent IP addresses, network domain of server hostname, Autonomous System Number, etc.) authorized or historically known to send legitimate messages for the identified sender are identified by the selected sender models for the sender. In some embodiments, determining whether the identified IP address is within an authorized neighborhood includes determining whether the identified IP address is within the boundaries of the block of adjacent IP addresses contained within the selected sender models. In some embodiments, determining whether the identified IP address is within an authorized neighborhood includes matching the hostname of the server at the identified IP address with an organization network domain name for all servers authorized to send for the sender per the selected sender models. In some embodiments, determining whether the identified IP address is within an authorized neighborhood includes matching the Autonomous System Number (ASN) of the identified IP with that of ASNs authorized to send for the sender per the selected sender models. In some embodiments, determining whether the identified IP address is within an authorized network neighborhood includes determining whether the identified IP address is between two known IP addresses authorized to send for the sender per the selected sender models. In some embodiments, determining whether the identified IP address is adjacent to an authorized network neighborhood includes determining whether a difference between the identified IP address and a known IP address authorized to send for the sender is less than a specified range value.

If at 512 it is determined that the identified IP address is contained within or adjacent to a network neighborhood (e.g., block of adjacent IP addresses, network domain of hostname, ASN, etc.) authorized or historically known to send legitimate messages for the sender of the message, at 514, a neighborhood component factor value of the measure of the authenticity is determined. This component factor value may be added, subtracted, multiplied, and/or otherwise utilized in determining an overall measure of authenticity of the message.

At 516, it is determined whether one or more other attributes of the received message match attributes historically seen in legitimate messages sent for the identified sender. For example, one or more headers of the email messages are analyzed for patterns contained within the sender model that are characteristic of legitimate messages sent for the identified sender. In some embodiments, a similarity measure between one or more headers for the received message and the pattern contained within the selected sender models is determined and compared to a specified threshold value. In some embodiments, the time of day and day of week the message was sent is compared to the common time periods during which legitimate messages are sent for the identified sender per the selected sender models. In some embodiments, the body of the received message is scanned for the existence of words, phrases, links and attachments that are commonly included in legitimate messages sent for the identified sender per the selected sender models.

If 516, it is determined that one or more other attributes of the received message match attributes historically seen in legitimate messages sent for the identified sender, at 518 a message attribute component factor value is determined for each message attribute of the received message based on whether it matches the corresponding message attribute seen in legitimate messages sent for the identified sender. These component factor values may be added, subtracted, multiplied, and/or otherwise utilized in determining an overall measure of authenticity of the message.

At 520, a reverse DNS/IP lookup (e.g., PTR lookup) is performed and it is determined whether the organization domain of the hostname/domain name result of the reverse DNS lookup matches a domain of the sender of the message.

If at 520 it is determined that the hostname/domain name result of the reverse DNS lookup matches the domain of the sender, at 522, a hostname-match component factor value of the measure of the authenticity is determined. This component factor value may be added, subtracted, multiplied, and/or otherwise utilized in determining an overall measure of authenticity of the message.

At 524, the measure of the authenticity is set based on one or more component factors. For example, the component factor values determined using the process of FIG. 5 are summed (e.g., weighted summed) to determine the measure of authenticity.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface configured to receive an electronic message; and
one or more hardware processors coupled with the communication interface and configured to:
identify a sender specified by the electronic message based at least in part on an internet protocol (IP) address associated with the electronic message;
determine a measure of authenticity that the sender specified by the electronic message is an actual sender of the electronic message using at least one sender model associated with the sender, including by being configured to:
determine whether the IP address associated with the electronic message is within or adjacent to a block of IP addresses that are known or authorized to send messages for the sender;
determine a neighborhood component factor value based on the determination of whether the IP address associated with the electronic message is within or adjacent to the block of IP addresses that are known or authorized to send messages for the sender;
determine whether one or more attributes included in a body of the message match attributes historically seen in bodies of legitimate messages sent by the sender; and
determine a message attribute component factor value based on the determination of whether the one or more attributes included in the body of the message match attributes historically seen in the bodies of the legitimate messages sent by the sender;
utilize the measure of authenticity to determine a measure of risk associated with the electronic message, wherein the measure of authenticity is based at least in part on the neighborhood component factor value and the message attribute component factor value, wherein the measure of risk identifies a likelihood that the electronic message is an undesired message; and
deliver the electronic message to a recipient of the electronic message based on whether the determined measure of risk is above a delivery threshold.

2. The system of claim 1, wherein the system is an email gateway server.

3. The system of claim 1, wherein identifying the sender specified by the electronic message includes identifying a network domain of the sender of the electronic message.

4. The system of claim 1, wherein the at least one sender model specifies message properties that are characteristic of authentic messages sent by or on behalf of the sender.

5. The system of claim 4, wherein the measure of authenticity is based at least in part by comparing message properties of the electronic message to message properties specified in the at least one sender model.

6. The system of claim 1, wherein the at least one sender model specifies one or more of the following determined to be associated with the sender: one or more IP addresses, one or more ranges/blocks of IP addresses, one or more network hostnames/domains, and one or more autonomous system numbers.

7. The system of claim 1, wherein the at least one sender model was at least in part automatically generated using one or more previously received messages from the sender.

8. The system of claim 1, wherein the processor is further configured to determine a measure of reputation of the sender.

9. The system of claim 8, wherein the measure of reputation of the sender identifies a general likelihood that the sender would send a message that is of value to the recipient.

10. The system of claim 8, wherein the measure of reputation of the sender is based in part on a local reputation of the sender, wherein the local reputation of the sender is specific to the recipient of the electronic message.

11. The system of claim 8, wherein the measure of reputation of the sender is based at least in part on at least one of a similarity factor value that indicates whether a domain of the sender mimics a domain of another sender, a domain registration history of the sender, a Domain Name Service activity of the sender, or a statistic history of messages sent by the sender.

12. The system of claim 8, wherein the measure of risk for the electronic message corresponds to the measure of authenticity and the measure of reputation of the sender.

13. The system of claim 1, wherein the one or more attributes included in the body of the electronic message include one or more of words, phrases, links, and attachments.

14. The system of claim 1, wherein the processor is further configured to determine whether to deliver the electronic message.

15. The system of claim 1, wherein the processor is further configured to label the electronic message or report a risk associated with the electronic message.

16. The system of claim 1, wherein the at least one sender model is configured to determine whether the IP address associated with the electronic message is associated with an IP address associated with message servers that are known or authorized to send messages for the sender.

17. The system of claim 1, wherein the at least one sender model is configured to determine whether the IP address associated with the electronic message is associated with an autonomous system number associated with message servers that are known or authorized to send messages for the sender.

18. The system of claim 1, wherein the at least one sender model is configured to determine whether the IP address associated with the electronic message is associated with a network hostname/domain associated with message servers that are known or authorized to send messages for the sender.

19. A method, comprising:
receiving an electronic message;
identifying a sender specified by the electronic message based at least in part on an internet protocol (IP) address associated with the electronic message;
determining a measure of authenticity that the sender specified by the electronic message is an actual sender of the electronic message using at least one sender model associated with the sender, including by:
determining whether the IP address associated with the electronic message is within or adjacent to a block of IP addresses that are known or authorized to send messages for the sender;
determining a neighborhood component factor value based on the determining of whether the IP address associated with the electronic message is within or adjacent to the block of IP addresses that are known or authorized to send messages for the sender;
determining whether one or more attributes included in a body of the message match attributes historically seen in bodies of legitimate messages sent by the sender; and
determining a message attribute component factor value based on the determining of whether the one or more attributes included in the body of the message match attributes historically seen in the bodies of the legitimate messages sent by the sender;
utilizing the measure of authenticity to determine a measure of risk associated with the electronic message, wherein the measure of authenticity is based at least in part on the neighborhood component factor value and the message attribute component factor value, wherein the measure of risk identifies a likelihood that the electronic message is an undesired message; and
delivering the electronic message to a recipient of the electronic message based on whether the determined measure of risk is above a delivery threshold.

20. A computer program product, the computer program product being embodied in a non-transitory computer readable storage medium and comprising computer instructions for:
receiving an electronic message;
identifying a sender specified by the electronic message based at least in part on an internet protocol (IP) address associated with the electronic message;
determining a measure of authenticity that the sender specified by the electronic message is an actual sender of the electronic message using at least one sender model associated with the sender, including by:
determining whether the IP address associated with the electronic message is within or adjacent to a block of IP addresses that are known or authorized to send messages for the sender;
determining a neighborhood component factor value based on the determining of whether the IP address associated with the electronic message is within or adjacent to the block of IP addresses that are known or authorized to send messages for the sender;
determining whether one or more attributes included in a body of the message match attributes historically seen in bodies of legitimate messages sent by the sender; and
determining a message attribute component factor value based on the determining of whether the one or more attributes included in the body of the message match attributes historically seen in the bodies of the legitimate messages sent by the sender;
utilizing the measure of authenticity to determine a measure of risk associated with the electronic message, wherein the measure of authenticity is based at least in part on the neighborhood component factor value and the message attribute component factor value, wherein the measure of risk identifies a likelihood that the electronic message is an undesired message; and
delivering the electronic message to a recipient of the electronic message based on whether the determined measure of risk is above a delivery threshold.

* * * * *